United States Patent
Shioya et al.

(10) Patent No.: US 6,217,142 B1
(45) Date of Patent: Apr. 17, 2001

(54) INK JET RECORDING SYSTEM USING DECOMPOSED IMAGES

(75) Inventors: Makoto Shioya, Tokyo; Yasuyuki Tamura, Yokohama, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/047,833

(22) Filed: Apr. 19, 1993

(30) Foreign Application Priority Data

Apr. 21, 1992 (JP) .................................................... 4-101234

(51) Int. Cl.⁷ ............................... B41J 2/205; B41J 2/145
(52) U.S. Cl. ................................................. 347/15; 347/41
(58) Field of Search ...................... 347/15, 9, 43, 347/41, 131, 183, 188, 240, 251; 358/298, 534, 455

(56) References Cited

U.S. PATENT DOCUMENTS

| | | | |
|---|---|---|---|
| 4,064,205 | * 12/1977 | Landsman | 264/25 |
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,723,129 | 2/1988 | Endo et al. | 347/56 |
| 4,740,796 | 4/1988 | Endo et al. | 347/56 |
| 4,952,942 | * 8/1990 | Kanome et al. | 347/15 |
| 5,136,307 | * 8/1992 | Uchida et al. | 346/136 |
| 5,343,231 | * 8/1994 | Suzuki | 347/14 |

FOREIGN PATENT DOCUMENTS

| | | | |
|---|---|---|---|
| 0294156 | 12/1988 | (EP) . | |
| 0300743 | 1/1989 | (EP) . | |
| 0430451 | 6/1991 | (EP) . | |
| 54-056847 | 5/1979 | (JP) . | |
| 59-123670 | 7/1984 | (JP) . | |
| 59-138461 | 8/1984 | (JP) . | |
| 60-071260 | 4/1985 | (JP) . | |
| 60-107975 | 6/1985 | (JP) . | |
| 1-026260 | * 1/1989 | (JP) | 347/37 |
| 1-026460 | * 1/1989 | (JP) | 347/37 |
| 3231861 | 10/1991 | (JP) . | |

* cited by examiner

*Primary Examiner*—Benjamin R. Fuller
*Assistant Examiner*—Craig A. Hallacher
(74) *Attorney, Agent, or Firm*—Fitzpatrick, Cella, Harper & Scinto

(57) ABSTRACT

An image corresponding to a single sheet of recording paper is divided into three decomposed images each having the substantially same expansion as that of the image, and one of the decomposed images is recorded on the recording paper while a drum is rotated and the recording head is continuously moved at a distance corresponding to a width of the recording head. Subsequently, other decomposed images are successively recorded on the recording paper. Thus, recording of the respective decomposed image is performed at a predetermined time interval kept between two continuous recordings. The foregoing time interval can be used as a time required for ink permeation into the recording medium.

27 Claims, 14 Drawing Sheets

GRAY LEVEL IN ORIGINAL IMAGE

DRUM ROTATING DIRECTION

ASSIGNMENT OF GRAY LEVEL DATA TO EACH DECOMPOSED IMAGE

GRAY LEVEL

1 : DATA REPRESENTING THAT INK IS EJECTED
0 : DATA REPRESENTING THAT INK IS NOT EJECTED

DECOMPOSED IMAGE 1

| 1 | 0 | 0 | 1 | 0 | 1 | 0 | 1 | 1 | 1 |

Pn points to the 6th cell.

DECOMPOSED IMAGE 2

| 0 | 1 | 0 | 0 | 1 | 0 | 1 | 1 | 1 | 1 |

Pn points to the 6th cell.

DECOMPOSED IMAGE 3

| 0 | 0 | 1 | 0 | 0 | 1 | 1 | 0 | 1 | 1 |

Pn points to the 6th cell.

FIG.4C

GRAY LEVEL IN ORIGINAL IMAGE

| 1 | 1 | 1 | 1 | 1 | 2 | 2 | 2 | 3 | 3 |
|---|---|---|---|---|---|---|---|---|---|

Pn, Pn+1

← DRUM ROTATING DIRECTION

FIG.5A

ASSIGNMENT OF GRAY LEVEL DATA TO EACH DECOMPOSED IMAGE

Pn, Pn+1

| | | | | | | | | | | DECOMPOSED IMAGE NO. |
|---|---|---|---|---|---|---|---|---|---|---|
| 1 | 1 | 1 | 1 | 1 | 1 | 2 | 2 | 2 | 1 | 1 |
| 2 | | | | | | 3 | 3 | 3 | 2 | 2 |
| 3 | | | | | | | | | 3 | 3 |

↑ GRAY LEVEL

FIG.5B

1 : DATA REPRESENTING THAT INK IS EJECTED
0 : DATA REPRESENTING THAT INK IS NOT EJECTED
DECOMPOSED IMAGE 1
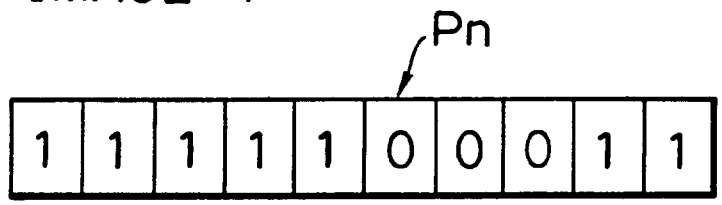
DECOMPOSED IMAGE 2
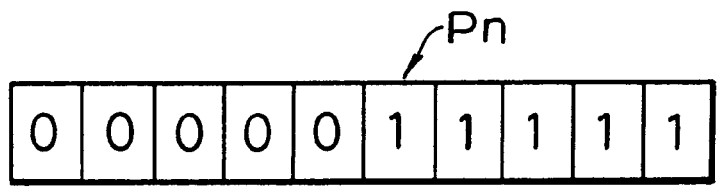
DECOMPOSED IMAGE 3
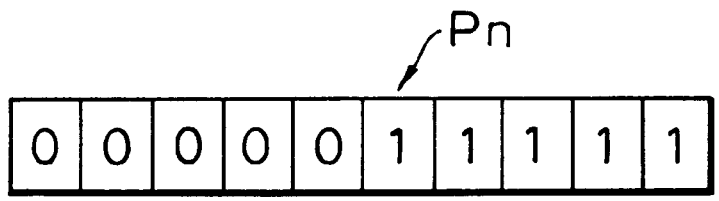
FIG. 5C

GRAY LEVEL IN ORIGINAL IMAGE

DRUM ROTATING DIRECTION

ASSIGNMENT OF GRAY LEVEL DATA TO EACH DECOMPOSED IMAGE

1 : DATA REPRESENTING THAT INK IS EJECTED
0 : DATA REPRESENTING THAT INK IS NOT EJECTED
DECOMPOSED IMAGE 1
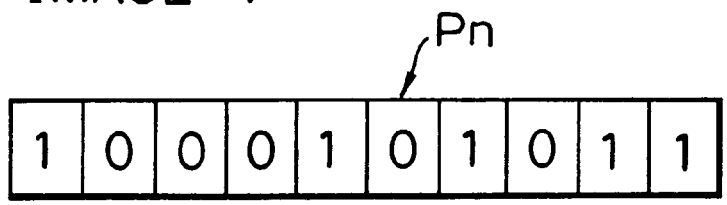
DECOMPOSED IMAGE 2
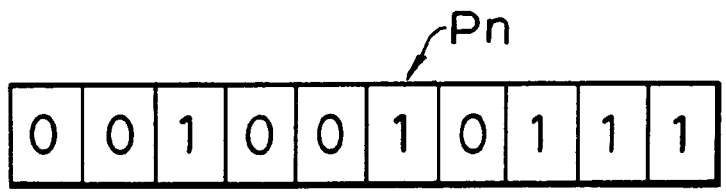
DECOMPOSED IMAGE 3
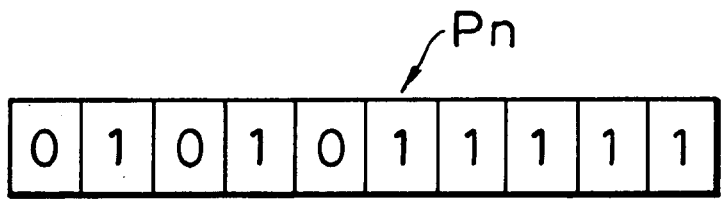
FIG.6C

INK JET RECORDING SYSTEM USING DECOMPOSED IMAGES

BACKGROUND OF THE INVENTION

1. Field of the Invention

The present invention relates to an apparatus and a method for performing a recording operation by ejecting ink to a medium to be recorded.

2. Description of the Prior Art

To perform a printing operation by employing an ink jet recording process, an ink which contains water soluble pigment, water soluble solvent and water as main components is usually used from the viewpoint of safety, easy handling and color conditioning. However, when the foregoing kind of water based ink is used for recording operations each performed using a so-called ordinary paper such as a high quantity paper, a copying papers or the like as a recording papers (recording media to be recorded with ink), there arises an occasion that the following several problems appear in the course of each recording operation.

Firstly, since ordinary papers each serving as a recording paper have comparatively poor ink permeability, a long time is required for achieving a step of fixing. For this reason, there arise problems that a recorded image is contaminated with unfixed ink due to contact with a certain unit placed on a transport path, a user's hand is contaminated with it, other recording paper is contaminated with it, and a recording unit is contaminated with it.

Secondly, when a color recording operation is performed, there arises an occasion that different kinds of colors are mixed with each other on a recording paper for the reason of poor ink permeability. In this case, a clear image can not be recorded on the recording paper.

Thirdly, when an ink readily permeable into ordinary papers is used in order to avoid the aforementioned problems, there arises an occasion that a coloring substance in the ink excessively permeates into the recording paper. In this case, so-called ink penetration occurs or good color development is not achieved with the recording paper after completion of a recording operation.

To obviate these problems, several proposals have been made with respect to a recording process as disclosed in, e.g., Japanese Patent Application Laying-Open Nos. 60-107975 and 3-231861. The recording process proposed according to each of prior arts is practiced such that a certain image is not recorded on a recording paper at a time but it is recorded on the recording paper by dividing the certain image into two parts per each pixel and then recording them at each of two scanning operations. Consequently, a quantity of ink to be permeated into the recording paper can relatively be reduced. Thus, even in case that recording papers each having poor ink permeability are used for recording operations, there does not arise the problem that different kinds of color inks are mixed with each other on a recording paper because they quickly permeate into the recording paper. Since a quantity of ink to be injected at a time can be reduced to a half when the proposed recording process is employed, there does not arise the problem that coloring substance excessively permeates into the recording paper even when an ink readily permeable into the recording paper is used for a recording operation. Consequently, a clear image visually recognizable with a beautiful color can easily be obtained with the proposed recording process.

However, in case that a recording operation is performed using a recording paper having more poor ink permeability or in case that a quantity of ink to be ejected per unit area is increased in order to raise up an image density for a clear image, it is practically difficult to solve the aforementioned problems with the proposed recording process. Specifically, since each recording operation is achieved by twice scanning divided images with the proposed recording process, a time interval between two scanning operations is relatively shortened in case that each recording operation is performed using a recording paper having poor ink permeability or in case that a quantity of ink to be ejected is increased. Further, since a subsequent droplet of ink is ejected to the recording paper before a droplet of ink ejected for a preceding recording operation is sufficiently fixed, there arises an occasion that the aforementioned three problems appear.

SUMMARY OF THE INVENTION

The present invention has been made in consideration of the foregoing background.

An object of the present invention is to provide an ink jet recording system in which it is possible to raise a quality of a recorded image.

A further object of the present invention is to provide an ink jet recording system in which it is possible to promote ink fixing to a recording medium, to decrease ink mixing of different colors and to raise color development.

A further object of the present invention is to provide an ink jet recording apparatus which makes it possible to prevent a problem of image deterioration from appearing due to ink permeation in case that a recording operation is performed using a recording paper having very poor ink permeability or in case that a quantity of ink to be ejected is increased for the purpose of raising up an image density.

A further object of the present invention is to provide an ink jet recording apparatus which makes it possible to record a predetermined unit image on a recording paper by way of steps of recording an image corresponding to a single decomposed driving datum among driving data required for recording the predetermined unit image, recording an image corresponding to a next decomposed datum while allowing the subsequent image to overlap the preceding image, and subsequently, repeating the foregoing recording based on decomposed data while the resultant images sequentially overlap one after another.

In the first aspect of the present invention, an ink jet recording apparatus which uses a recording head for ejecting ink in order to perform recording by ejecting ink from the recording head to a recording medium, comprises;

scanning means for scanning the recording medium relative to the recording head, head driving means for allowing the recording head to eject ink based on driving data, data processing means for decomposing the driving data for recording a predetermined unit image on the recording medium into a plurality of decomposed driving data corresponding to an image having the substantially same expansion as that of the predetermined unit image to be recorded on the recording medium based on the driving data, and record controlling means for controlling the scanning means so as to scan the recording medium relative to the recording head and for assigning each of the plurality of decomposed driving data to driving data for the head driving means which are used for respective ones of plural different scanning operations which are not continuously, so that the predetermined unit image is recorded.

In the second aspect of the present invention, an ink jet recording apparatus which uses a recording head for discharging ink in order to perform recording by discharging ink from the recording head to a recording medium, comprises;

supporting means for supporting the recording medium;

scanning means for scanning the recording medium relative to the recording head while the recording medium is supported by the supporting means, head driving means for allowing the recording head to discharge ink based on driving data, data processing means for decomposing the driving data for recording a predetermined unit image on the recording medium into a plurality of decomposed driving data corresponding to an image having the substantially same expansion as that of the predetermined unit image to be recorded on the recording medium based on the driving data, record controlling means for controlling the scanning means so as to scan the recording medium relative to the recording head and for assigning each of the plurality of decomposed driving data to driving data for the head driving means which are used for respective ones of plural different scanning operations which are not continuously performed, so that the predetermined unit image is recorded, and close contacting means for making the recording medium in close contact with the supporting means while at least the predetermined unit image is recorded on the recording medium.

In the third aspect of the present invention, an ink jet recording method which uses a recording head for ejecting ink in order to perform recording by ejecting ink from the recording head to a recording medium, comprises the steps of;

decomposing an image to be recorded into a plurality of decomposed images, recording one of the decomposed images ahead of other decomposed images, and recording a subsequent decomposed image on the ahead recorded decomposed image in the overlapped state by a scanning which is not continuously effected subsequent to the scanning performed for the ahead recorded decomposed image, wherein each pixel in the image is formed with the ink ejected from different ejection portions during the ahead performed recording and the subsequently performed recording.

The above and other objects, effects, features and advantages of the present invention will become more apparent from the following description of embodiments thereof taken in conjunction with the accompanying drawings.

BRIEF DESCRIPTION OF THE DRAWINGS

The present invention is illustrated in the following drawings in which:

FIG. 4C is a schematic view showing driving data on each decomposed image in accordance with the recording process of the first embodiment;

FIG. 5A is a schematic view showing a pixel arrangement in accordance with another image decomposing process associated with the foregoing recording process;

FIG. 5B is a schematic view illustrating assignment of gray level data to each decomposed image in accordance with another image decomposing process;

FIG. 5C is a schematic view showing driving data on each decomposed image in accordance with another image decomposing process;

FIG. 6C is a schematic view showing driving data on each decomposed image in accordance with further decomposing process;

DESCRIPTION OF THE PREFERRED EMBODIMENTS

The present invention will now be described in detail hereinafter with reference to the accompanying drawings which illustrate preferred embodiments thereof.

First Embodiment

Figure 1:
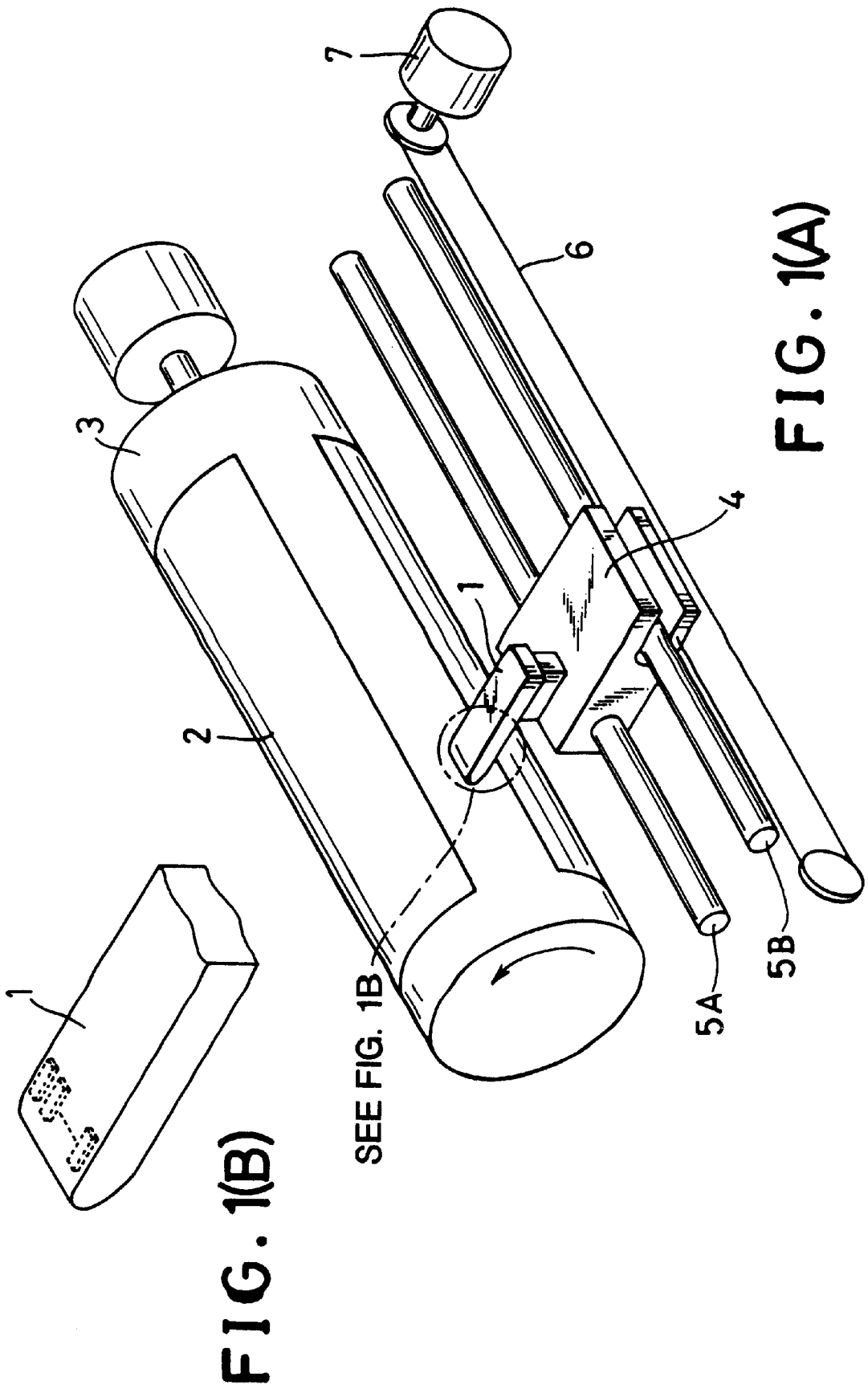
FIG. 1 consisting of FIG. 1(A) and FIG. 1(B), is a schematically perspective view of an ink jet recording apparatus according to a first embodiment of the present invention.

FIG. 1 is a schematic perspective view showing an ink jet recording apparatus of one embodiment of the present invention. In FIG. 1, reference numeral 1 designates a recording head. On the recording head 1, three hundred ejection ports (not shown) are arranged with a pitch of 64 μm in the longitudinal direction of the apparatus, i.e., in the sub-scanning direction to be described later. An ink path is disposed corresponding to each ejection port(discharge pont) with which the ink path communicates, and a heater (not shown) for generating thermal energy to be used for ink ejection is disposed in each ink path. In response to an electrical pulse applied to the heater, heat is generated by the heater, causing film boiling to occur in an ink. As a bubble grows attributable to the film boiling, ink is ejected from the ejection port. It should be added that an ejecting frequency of the recording head 1 is set to 10 kHz.

Reference numeral 4 designates a carriage which serves to move the recording head 1 mounted thereon. To slidably move the carriage 4, two guide shafts 5A and 5B extending in parallel with each other are arranged in operative association with the carriage 4 such that the guide shaft 5A is inserted through the carriage 4 while the guide shaft 5B is slidably engaged with the carriage 4. The carriage 4 is connected to an endless belt 6 which is spanned in parallel with the guide shafts 5A and 5B to move the carriage 4. As a carriage motor 7 is rotationally driven, the carriage 4 is slidably moved via the endless belt 6 with the aid of the guide shafts 5A and 5B. An ink feed tube (not shown) for feeding an ink from an ink tank (not shown) as well as a flexible cable (not shown) for transmitting a driving signal based on recording data and a control signal from a controlling unit (not shown) for the ink jet recording apparatus are connected to the recording head 1. The ink feed tube and the flexible cable are made of flexible materials so as to enable them to follow the carriage 4 as the latter is moved.

Reference numeral 2 designates a recording paper. The recording paper 2 is wound around a drum 3 while it is immovably retained on the drum 3 by the function of electrostatic attraction. The drum 3 is rotated by a paper feed motor (not shown).

Figure 2:
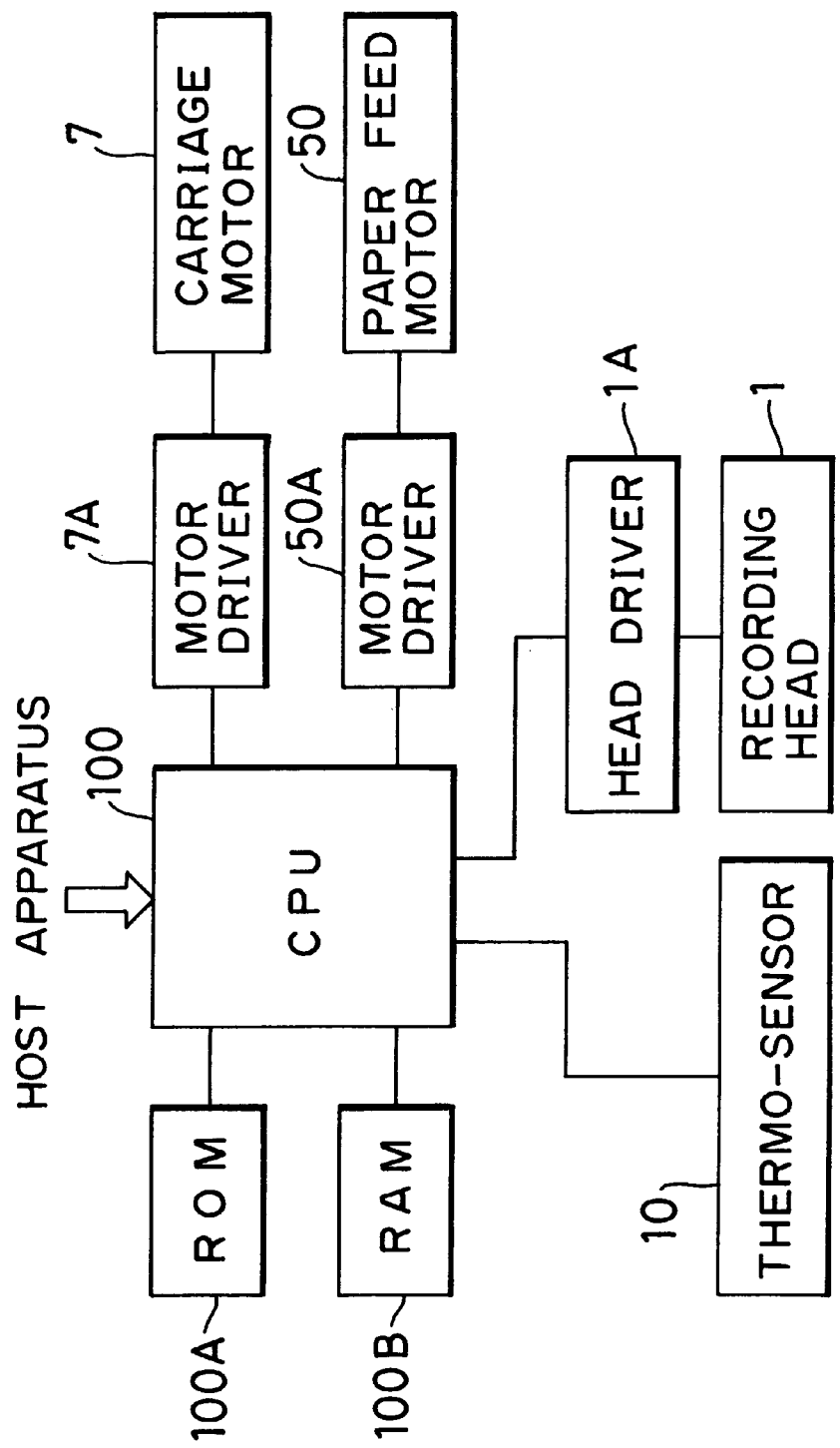
FIG. 2 is a block diagram showing a controlling structure for the ink jet recording apparatus shown in FIG. 1.

FIG. 2 is a block diagram which shows a controlling structure for the ink jet recording apparatus shown in FIG. 1.

In FIG. 2, a CPU 100 serves to execute controlling processing for operations of the components constituting the ink jet recording apparatus as well as data processing to be described later. A procedure for the foregoing processings are memorized in a ROM 100A, and a RAM 100B is used as a work area for executing the foregoing processings.

Ink ejection from the recording head 1 is performed in a manner that the CPU 100 supplies driving data for driving an electrothermal converting element, i.e, above described heater and a drive controlling signal to a head driver 1A. In addition, the CPU 100 controls rotation of the carriage motor 7 for slidably moving the carriage 4 as well as rotation of a paper feed motor for rotating the drum 3 via motor drivers 7A and 50A, respectively.

Figure 3:
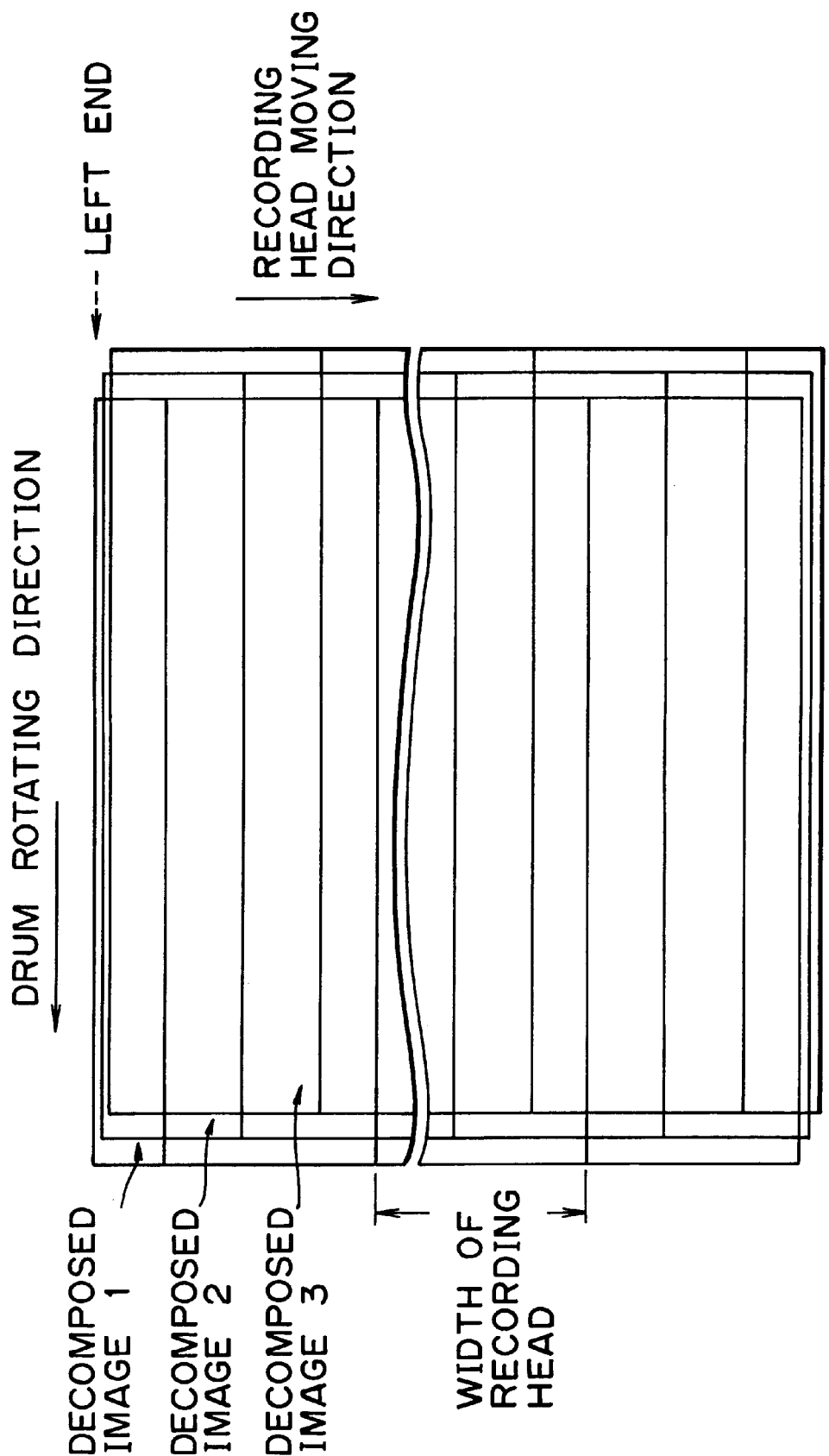
FIG. 3 is a schematic view of a recorded image, particularly illustrating a recording process employed for the ink jet recording apparatus constructed according to the first embodiment of the present invention.

Next, description will be made below with respect to case that a recording operation is performed under conditions that a pixel density is set to 16 dots/mm and a gray level is set to four, i.e., the number of ink droplets is set to 0 to 3. FIG. 3 is a schematic view which shows a recording process to be practiced according to this embodiment of the present invention, particularly illustrating that the recording paper 2 wound around the drum 3 is expanded in the flattened state. To assure that decomposed images are clearly distinguished from each other, they are offset from each other as shown in FIG. 3. Here, the decomposed image represents an image having the substantially same expansion (area) as that of an image to be recorded, and it becomes the foregoing image to be recorded by synthesizing decomposed images together.

To perform a recording operating, first, image data for the whole image are processed with four gray levels under conditions that an image density is set to 16 dots/mm, and thereafter, the whole image data are decomposed to three image data per each pixel. This decomposing process is concerned with a method proposed by a common applicant to the present invention, and it will be described below with reference to FIG. 4A to FIG. 4C.

Figure 4A:
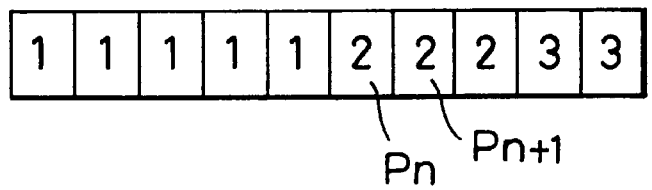
FIG. 4A is a schematic view showing a pixel arrangement in accordance with the recording process of the first embodiment.

FIG. 4A is a schematic view which shows a gray level in an original image per each pixel, and it represents a part of a single row of pixels arranged in the direction of rotation of the drum, i.e., in a main scanning direction. In the shown case, numerals "1", "2" and "3" placed on respective pixels show the number of ink droplets ejected to each pixel.

Figure 4B:
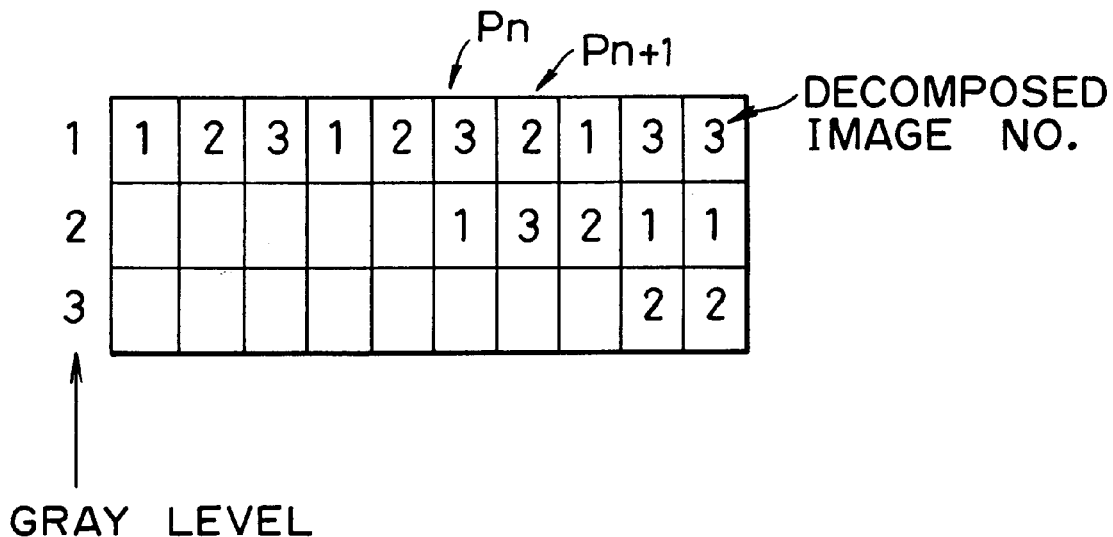
FIG. 4B is a schematic view illustrating assignment of gray level data to each decomposed image in accordance with the recording process of the first embodiment.

FIG. 4B is an illustrative view illustrating how gray level data in each pixel described above are assigned to three decomposed images. In the shown case, the gray level data are sequentially assigned to the respective decomposed images.

For example, in case that the gray level of a pixel $P_n$ is "2" as shown in FIG. 4A, two ink droplets to be shot into this pixel are shot into pixels of a decomposed image 3 and a subsequent decomposed image 1. Also in this case, since the gray level of a next pixel $P_{n+1}$ is "2", decomposed images to be assigned are a decomposed image 2 subsequent to the decomposed image 1 finally assigned at the pixel $P_n$ and a decomposed image 3 subsequent to the decomposed image 2.

FIG. 4C is a schematic view which shows driving data corresponding to the pixels of the respective decomposed images based on the assignment shown in FIG. 4B. For example, a pixel $P_n$ has driving data for ink droplets to be ejected for the decomposed image 3 and the decomposed image 1 as shown in FIG. 4B.

On completion of the assignment of gray level data to respective decomposed images, the recording head 1 is located at the left end shown in FIG. 1 (coincident with the position designated by "left end" in FIG. 3), and thereafter, the drum 3 is rotated by a single turn so as to record a part of the decomposed image 1 to be recorded on the recording paper 2 using only one hundred ejection ports designated by ejection port NO. 201 to 300 (wherein it is assumed that ejection port Nos. 1 to 300 are given to three hundred ejection ports as seen from the left side to the right side in FIG. 1). Next, the recording head 1 is moved in the rightward direction as seen in FIG. 1 (in the downward direction as seen in FIG. 3) at a distance equivalent to three hundred pixels and the drum 3 is then rotated by a single turn so that a part of the decomposed image 1 is recorded on the recording paper 2 using three hundred ejection ports designated by injecting port Nos. 1 to 300. Subsequently, the steps of movement of the recording head 1 in the rightward direction at a distance equivalent to three hundred pixels, and rotation of the drum 1 by a single turn in which ejection of ink droplets from ejection ports designated by ejection port Nos. 1 to 300 is performed are sequentially repeated so as to record the whole decomposed image 1.

On completion of the recording of the decomposed image 1, the recording head 1 is returned to the left end position shown in FIG. 1 so that the decomposed image 2 is recorded on the recording paper 2. To this end, first, the drum 3 is rotated by a single turn and recording is then performed using two hundred ejection ports designated by ejection port Nos. 101 to 300. Subsequently, the steps of movement of the recording head 1 in the rightward direction at a distance equivalent to three hundred pixels, rotation of the drum 3 by a single turn in which ejection of ink droplets from the ejection ports designated by ejecting port Nos. 1 to 300 is performed are sequentially repeated so as to record the whole decomposed image 2. At the last step of this recording operation, recording is performed using only two hundred ejection ports designated by ejection ports Nos. 1 to 200 so as to allow the image end of the decomposed image 2 to be aligned with that of the decomposed image 1.

On completion of the recording for the decomposed image 2, the recording head 1 is returned to the left end position shown in FIG. 1 so that the decomposed image 3 is recorded on the recording paper 2. The recording of the decomposed image 3 is performed by using three hundred ejecting ports designated by ejection port Nos. 1 to 300 from the first. Subsequently, partial recording operation is sequentially repeated, and at the last step of the recording, recording is performed by using only one hundred ejection ports designated by ejection port Nos. 1 to 100 so as to allow the image end of the decomposed image 3 to be aligned with that of the decomposed images 1 and 2.

As is apparent from the above description, scanning for the recording is not spatially continuously performed from decomposed image to decomposed image.

Since only one ink droplet is shot into each pixel for recording of each decomposed image and at same time ink droplets for one pixel are shot at a comparatively long time interval kept between adjacent recordings for the decomposed images even in case that the maximum number of ink droplets used for recording per each pixel is set to, e.g., "3" and then a quantity of ink ejected to the recording paper is set to a relatively large value, sufficient fixing is achieved when a recording paper having poor ink permeability is used for performing a recording operation. For example, in case that recording is performed while a recording paper having dimensions corresponding to an A-3 size is wound around the drum 3 in the longitudinal direction thereof, a recording time spent for each decomposed image is ten and several seconds. This means that the foregoing time is a long time interval enough to enable the preceding shot ink droplets to be sufficiently fixed until ink droplets are subsequently shot. Consequently, there do not arise a matter that a recorded image is contaminated with an extra quantity of overflowed ink, and moreover, different kinds of inks are mixed with each other on the recording paper. In addition, since coloring substance of ink remains on the upper surface of the recording paper, so-called ink penetration does not occur, resulting in a clear image visually recognizable with a beautiful color being obtained.

In the aforementioned embodiment, a next decomposed image is recorded after a first decomposed image is completely recorded on the recording paper. Alternatively, since ink droplets are fixed on the recording paper to some extent for several seconds, the next decomposed image may be recorded after the first decomposed image is partially recorded.

According to the above-described embodiment of the present invention, when a single pixel is recorded with a plurality of ink droplets, recording is performed by ejecting ink droplets from different ejection ports (for example, a pixel located at the end position as seen in the direction of movement of the recording head as seen in FIG. 3 is formed by ink droplets ejected from ejection ports designated by ejection port Nos. 1, 101 and 201). Thus, a clear image having few density variation(shading) can be obtained because fluctuation of a quantity of ejected ink among ejection ports is averaged. As shown in FIGS. 4A–4C, since pixels having one ink droplet shot are formed by different decomposed images respectively, i.e., they are formed by ejecting ink droplets ejected from different ejection ports, an advantageous effect is that fluctuation of a quantity of ejected ink among ejection ports is reduced so that the pixels are formed with few fluctuation of a quantity of ejected ink.

Incidentally, an image decomposing process should not be limited to the process which has been described above with reference to the embodiment of the present invention. Alternatively, a process of decomposing an image depending on the position of each pixel (which will later be described in second and third embodiments of the present invention), a process of decomposing an image depending on the gray level or a process of randomly decomposing an image may be employed in place of the foregoing process.

Next, the process of decomposing an image depending on a gray level and the process of randomly decomposing an image will briefly be described below with reference to FIG. 5A to FIG. 5C and FIG. 6A to FIG. 6C.

FIG. 5A to FIG. 5C are schematic views similar to FIG. 4A to FIG. 4C each of which illustrates the process of decomposing an image depending on a gray level. As shown in FIG. 5B, a pixel having a gray level designated by a numeral "1" is assigned to a decomposed image 1, and pixels $P_n$, $P_{n+1}$ and others each having a gray level designated by a numeral "2" are assigned to decomposed images 2 and 3. In addition, pixels each having a gray level designated by a numeral "3" are equally assigned to decomposed images 1, 2 and 3. Consequently, driving data as shown in FIG. 5C are prepared for recording the respective decomposed images. For example, ink is ejected for the decomposed images 2 and 3 based on the driving data for the pixel $P_n$.

Figure 6A:
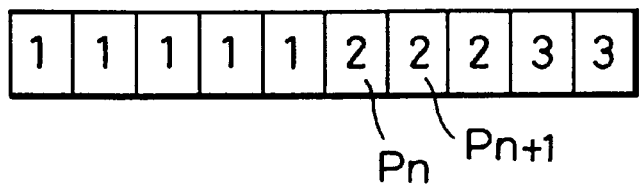
FIG. 6A is a schematic view showing a pixel arrangement in accordance with further image decomposing process associated with the foregoing recording process.
Figure 6B:
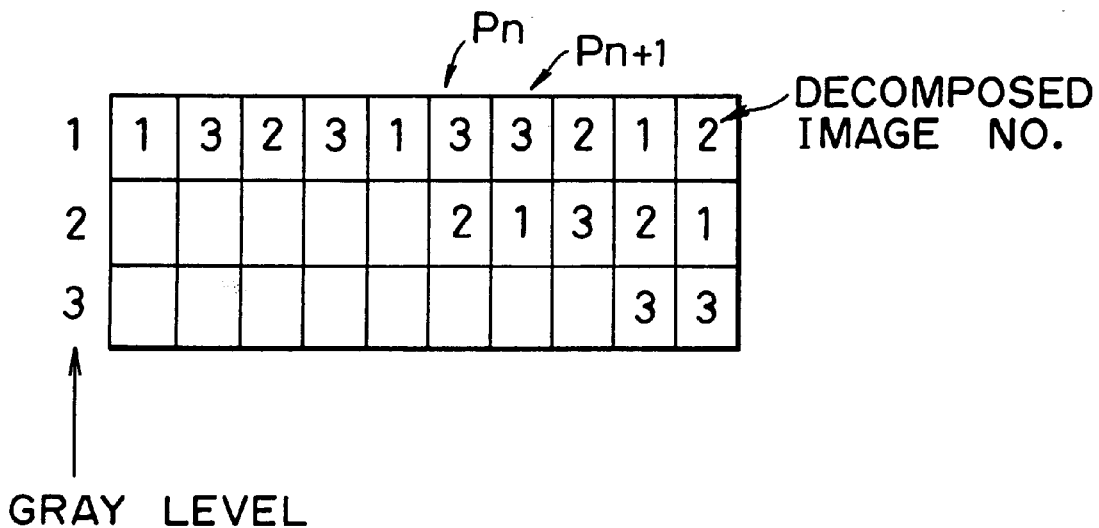
FIG. 6B is a schematic view illustrating assignment of gray level data to each decomposed image in accordance with further image decomposing process.

FIG. 6A to FIG. 6C are schematic views similar to FIG. 5A to FIG. 5C each of which illustrates the process of randomly decomposing an image. Gray level data for each pixel are assigned to one of decomposed images 1 to 3 depending on the number generated by, e.g., a random number generator. For example, the gray level of a pixel P designated by a numeral "2" is assigned to the decomposed images 2 and 3. FIG. 6C shows driving data for the respective decomposed images which are obtained based on the results derived from the foregoing assignment.

In case that another decomposed image is repeatedly recorded on a part of the recording paper for which recording is once achieved by ejecting ink droplets in the same manner as the first embodiment described above, there arises a problem that the recording paper elongates due to absorption of the ink. Because of this problem, positional offset of the position of each pixel from the ink ejecting position is liable to occur with each decomposed image, causing a quality of image to be readily degraded. However, according to the embodiment of the present invention, since the recording paper is held around the drum while coming in close contact with the same, the positional offset of the pixel hardly occurs. With respect to a process of recording each decomposed image by repeatedly inserting a recording paper into a recording paper transport path every time the decomposed image is recorded on the recording paper, it is found that the pixel position is readily offset from the ink ejecting position. For this reason, a recording paper transporting process proposed according to the present invention is advantageously employable for the foregoing process.

The method which makes the recording paper and the drum come closely into contact should not be limited to the electrostatic attraction method described above. An well known method such as vacuum attraction or the like may be used.

Second Embodiment

Figure 7:
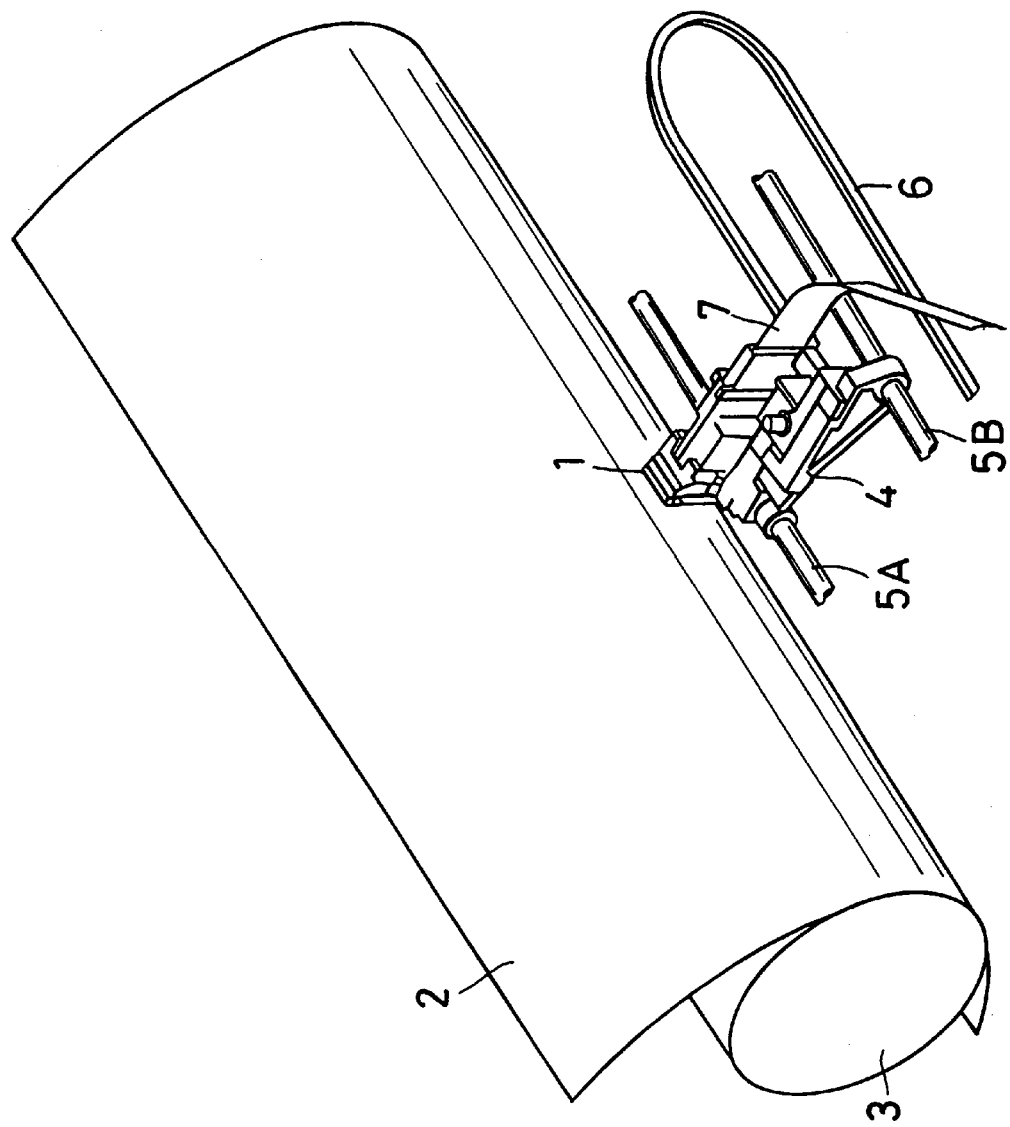
FIG. 7 is a schematically perspective view of an ink jet recording apparatus according to a second embodiment of the present invention.

FIG. 7 is a schematic perspective view showing an ink jet recording apparatus of another embodiment of the present invention.

In FIG. 7, reference numeral 1 designates a recording head which includes sixty ejection ports (not shown) with a pitch of 64 $\mu$m which are arranged in the sub-scanning direction. The recording head 1 has an ejecting frequency of 8 kHz. Reference numeral 3 designates a platen roller which extends in parallel with guide shafts 5A and 5B in the longitudinal direction. A carriage 4 having the recording head 1 mounted thereon is adapted to slidably move along the guide shafts 5A and 5B so that scanning is achieved by the movable carriage 4. Reference numeral 2 designates a recording paper which is circumferentially transported as the platen roller 3 is rotated.

Figure 8:
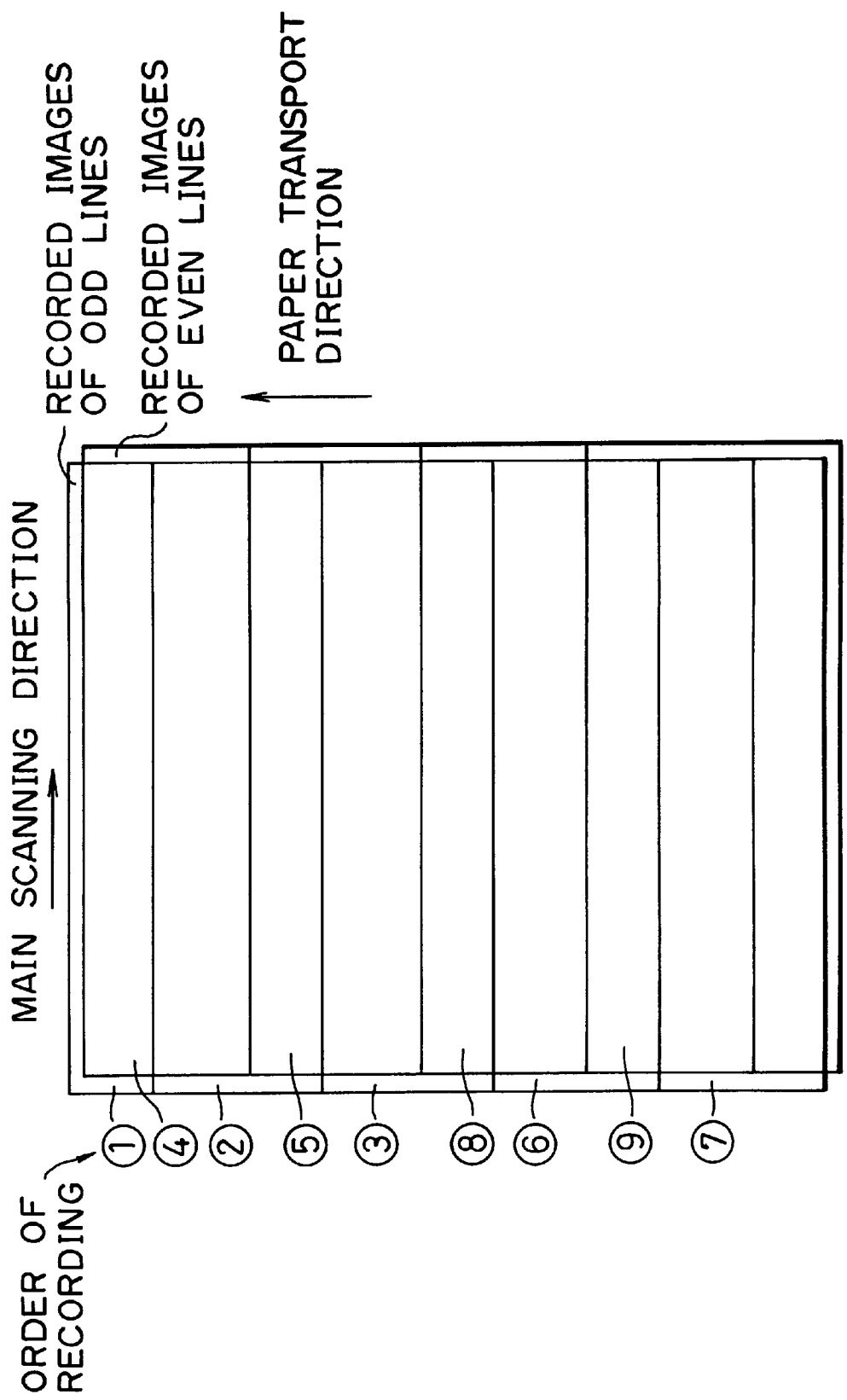
FIG. 8 is a schematic view of a recorded image, particularly illustrating a recording process employed for the ink jet recording apparatus according to the second embodiment of the present invention.

FIG. 8 is a schematic view of a recorded image which is formed while a recording operation is performed with the ink jet recording apparatus. In this embodiment, an original image is recorded on the recording paper 2 while it is divided into odd lines of recorded images and even lines of recorded images on the assumption that a single row of pixels arranged in the main scanning direction is defined as a single line. All ejection ports (not shown) arranged on the recording head 1 are used for forming the odd lines of recorded images as well as the even lines of recorded images. With the arrangement of the ejection ports in that way, a distance between adjacent lines is set to a half of a pitch between adjacent ejection ports arranged in the above-described manner. Next, a recording process to be practiced according to the present embodiment will be described below with reference to FIG. 8.

When a recording operation is performed, first, image data covering the whole image are inputted into a controlling unit (not shown) for the ink jet recording apparatus, and then, image processing is achieved with two gray levels based on the image data under a condition that a pixel density is set to 32 dots/mm. With the controlling unit, all the image data are decomposed into two kinds of image data, one of them being image data corresponding to a group of odd lines as counted from the upper end of the recording paper 2 and the other one being image data corresponding to a group of even lines as counted from the same.

Next, odd number lines are recorded on the recording paper 2 using only thirty ejection ports designated by ejection port Nos. 31 to 60 while the recording head 1 is moved from the left end shown in FIG. 7 in the rightward direction (see an order of recording ① in FIG. 8). Subsequently, the recording paper 2 is transported in the upward direction at a distance corresponding to 120 pixels (wherein it is assumed that the recording head 1 is relatively displaced in the downward direction as seen in FIG. 8) so that subsequent odd number lines are recorded on the recording paper 2 using sixty ejection ports designated by ejection port Nos. 1 to 60 (see the order of recording ② in FIG. 8). Subsequently, the recording paper 2 is transported further in the upward direction at a distance corresponding to 120 pixels so that another subsequent odd number lines are recorded on the recording paper 2 using the sixty ejection ports designated by ejecting port Nos. 1 to 60 (see the order of recording ③ in FIG. 8).

Next, the recording paper 2 is returned in the downward direction at a distance corresponding to 179 pixels so that even number lines located between the odd number of recorded lines are recorded on the recording paper 2 using the sixty ejection ports designated by ejection port Nos. 1 to 60 (see the order of recording ④ in FIG. 8). Subsequently, the recording paper 2 is transported in the upward direction at a distance corresponding to 120 pixels so that subsequent even number lines are likewise recorded on the recording paper 2 using the sixty ejection ports designated by ejection port Nos. 1 to 60 (see the order of recording ⑤ in FIG. 8).

Subsequently, the recording paper 2 is transported further in the upward direction at a distance corresponding to 179 pixels so that odd number lines are recorded on the recording paper 2 using the sixty ejection ports designated by ejection port Nos. 1 to 60 (see the order of recording ⑥ in FIG. 8).

Thus, the whole image is recorded by repeating the aforementioned recording procedure which is summarized in the following.

Order of recording ①: Odd number lines are recorded on the recording paper using thirty ejecting ports designated by ejecting port Nos. 31 to 60.

Order of recording ②: The recording paper is transported in the upward direction at a distance corresponding to 120 pixels so that odd number lines are recorded on the recording paper using sixty ejection ports designated by ejection port Nos. 1 to 60.

Order of recording ③: The recording paper is transported further in the upward direction at a distance corresponding to 120 pixels so that an odd number lines are recorded on the recording paper using the sixty ejection ports designated by ejection port Nos. 1 to 60.

Order of recording ④: The recording paper is returned in the downward direction at a distance corresponding to 179 pixels so that even number lines are recorded on the recording paper using the sixty ejection ports designated by ejection ports Nos. 1 to 60.

Order of recording ⑤: The recording paper is transported in the upward direction at a distance corresponding to 120 pixels so that even number lines are recorded on the recording paper using the sixty ejection ports designated by ejection port Nos. 1 to 60.

Order of recording ⑥: The recording paper is transported further in the upward direction at a distance corresponding to 179 pixels so that odd number lines are recorded on the recording paper using the sixty ejection ports designated by ejection port Nos. 1 to 60.

Subsequently, the order of recording ③ to ⑥ is repeated.

In such manner, odd number of lines and even number of lines are interlaced with each other by twice executing main scanning so that they are recorded on the recording paper with a resolution equivalent to the image density twice as large as the arrangement density of the ejection ports. At this time, since dots for forming an odd number of line and an even number of line located adjacent to each other are recorded on the recording paper at such a time interval that main scanning for other part of the recording paper is once or twice interposed between adjacent lines, the ink ejected onto the recording paper is progressively fixed. Consequently, there hardly arise problems that the recorded image is contaminated with the injected ink, and moreover, different kinds of color inks are mixed with each other on the recording paper. In addition, since a comparatively large quantity of coloring substance remains on the upper surface of the recording paper, so-called ink penetration hardly occurs, resulting in a clear image visually recognizable with a beautiful color being obtained with the ink jet recording apparatus.

As is apparent from FIG. 7, a cylindrical platen roller 3 having a comparatively large diameter is used for the ink jet recording apparatus, and when the recording paper 2 is transported, the platen roller 3 is rotated while the recording paper 2 is brought in close contact with the platen roller 3. With this construction, while the recording paper 2 is transported in the upward/downward direction, a part of the recording paper 2 to be recorded with ink is brought in close contact with the platen roller 3 from the time when a recording operation is started till the time when it is completed. Therefore, as long as rotation of the platen roller 3 is exactly controlled, the relative positional relationship between even number lines and odd number lines can exactly be maintained.

In this embodiment, since pixel lines located adjacent to each other are formed with ink droplets ejected from different ejection ports, fluctuation of a quantity of ejected ink between adjacent ejection ports is averaged from line to line, resulting in a clear image having few density fluctuation being obtained.

Third Embodiment

Figure 9:
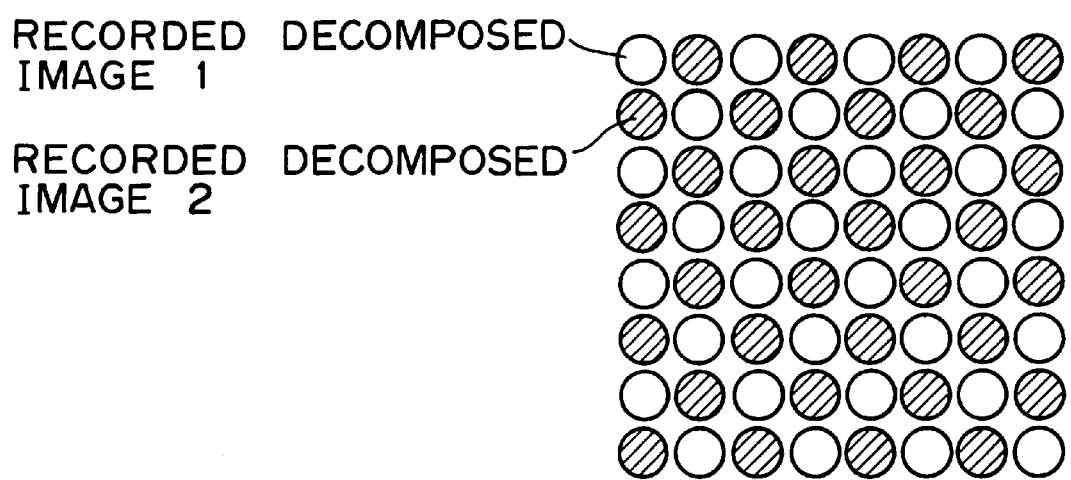
FIG. 9 is a schematic view of a recorded image illustrating a recording process to be practiced according to a third embodiment of the present invention.

A recording operation is performed with two gray levels under a condition that a pixel density is set to 11.8 dots/mm, with the aid of the same ink jet recording apparatus as that in the first embodiment with the exception that the number of ejection ports is set to 200 and a pitch between adjacent ejection ports is set to 84.67 μm. FIG. 9 is an illustrative view which schematically shows a recording process to be practiced according to the embodiment of the present invention. As is apparent from the drawing, an image is decomposed into two types of complimentary patterns which in turn are recorded on a recording paper by twice effecting main scanning.

When a recording operation is performed, first, image data covering the whole image are inputted into a controlling unit (not shown) for the ink jet recording apparatus, image processing is then effected based on the image data with two gray levels under a condition that a pixel density is set to 11.8 dots/mm, and thereafter, the image is decomposed into two groups of pixels. Specifically, in case that it is assumed that a certain pixel is located at the number i as counted in the main scanning direction as well as at the number j as counted in the sub-scanning direction, if a value of i+j is an even number, the pixel data are assigned to image data for a decomposed image 1. On the other hand, if the value of i+j is an odd number, they are assigned to image data for a decomposed image 2.

Next, while the recording head 1 is located at the left end of the drum 3 as seen in FIG. 1, the drum 3 is rotated by a single turn so that a decomposed image 1 is recorded on the recording paper 2 using only one hundred ejection ports designated by ejection port Nos. 101 to 200. Subsequently, the recording head 1 is moved in the rightward direction at a distance corresponding to 200 pixels and the drum 1 is then rotated by a single turn so that the decomposed image 1 is recorded on the recording paper 2 using two hundred ejection ports designated by ejection port Nos. 1 to 200. Subsequently, recording is repeatedly effected until the whole decomposed image 1 is recorded on the recording paper 2 in such a manner that the recording head 1 is moved further in the rightward direction at a distance equivalent to 200 pixels and the drum 3 is then rotated by a single turn.

On completion of the recording operation for the decomposed image 1, the recording head 1 is returned to the left end so that a decomposed image 2 is recorded on the recording paper 2. At this time, the drum 3 is rotated by a single turn so that the decomposed image 2 is recorded on the recording paper 2 using the two hundred ejection ports designated by ejection port Nos. 1 to 200. Subsequently, recording is repeatedly effected until the whole decomposed image 2 is recorded on the recording paper 2 in such a manner that the recording head 1 is moved in the rightward direction at a distance corresponding to 200 pixels and the drum 3 is then rotated by a single turn so that the decomposed image 2 is recorded on the recording paper 2 using the two hundred ejection ports designated by ejection port Nos. 1 to 200. After the final step of scanning the decomposed image 2, recording is effected using only one hundred ejection ports designated by ejection port Nos. 1 to 100 so that the image end of the decomposed image 2 is aligned with that of the decomposed image 1.

While recording is effected in the above-described manner, since ink droplets to be recorded on the recording paper 2 are shot into adjacent pixels at a comparatively long time interval therebetween, it is possible to sufficiently fix the ink droplets within the foregoing time interval even though a recording paper having poor ink permeability is used for the recording operation. Consequently, there do not arise problems that the recorded image is contaminated with ink, and moreover, different kinds of color inks are mixed with each other on the recording paper. In addition, since a coloring substance remains on the comparatively upper surface of the recording paper, so-called ink penetration does not occur, resulting in a clear image visually recognizable with a beautiful color being obtained with the ink jet recording apparatus.

In this embodiment, after a certain decomposed image is fully recorded on the recording paper, another decomposed image is recorded on the recording paper. Alternatively, due to the fact that ink droplets are fixed in the recording paper when several seconds elapse, another decomposed image may be recorded on the recording paper after a part of one decomposed image is recorded on the recording paper.

Further, in this embodiment, since adjacent pixels are formed by the ink droplets ejected from different ejection ports, fluctuation of a quantity of ink ejected from the ejection ports is averaged between the adjacent pixels, resulting in a clear image having few color fluctuation therebetween being obtained with the ink jet recording apparatus.

Furthermore, similarly to the first embodiment, since the recording paper is made come closely in contact with the drum, the positional offset of the pixel hardly occurs.

Fourth Embodiment

Figure 10:
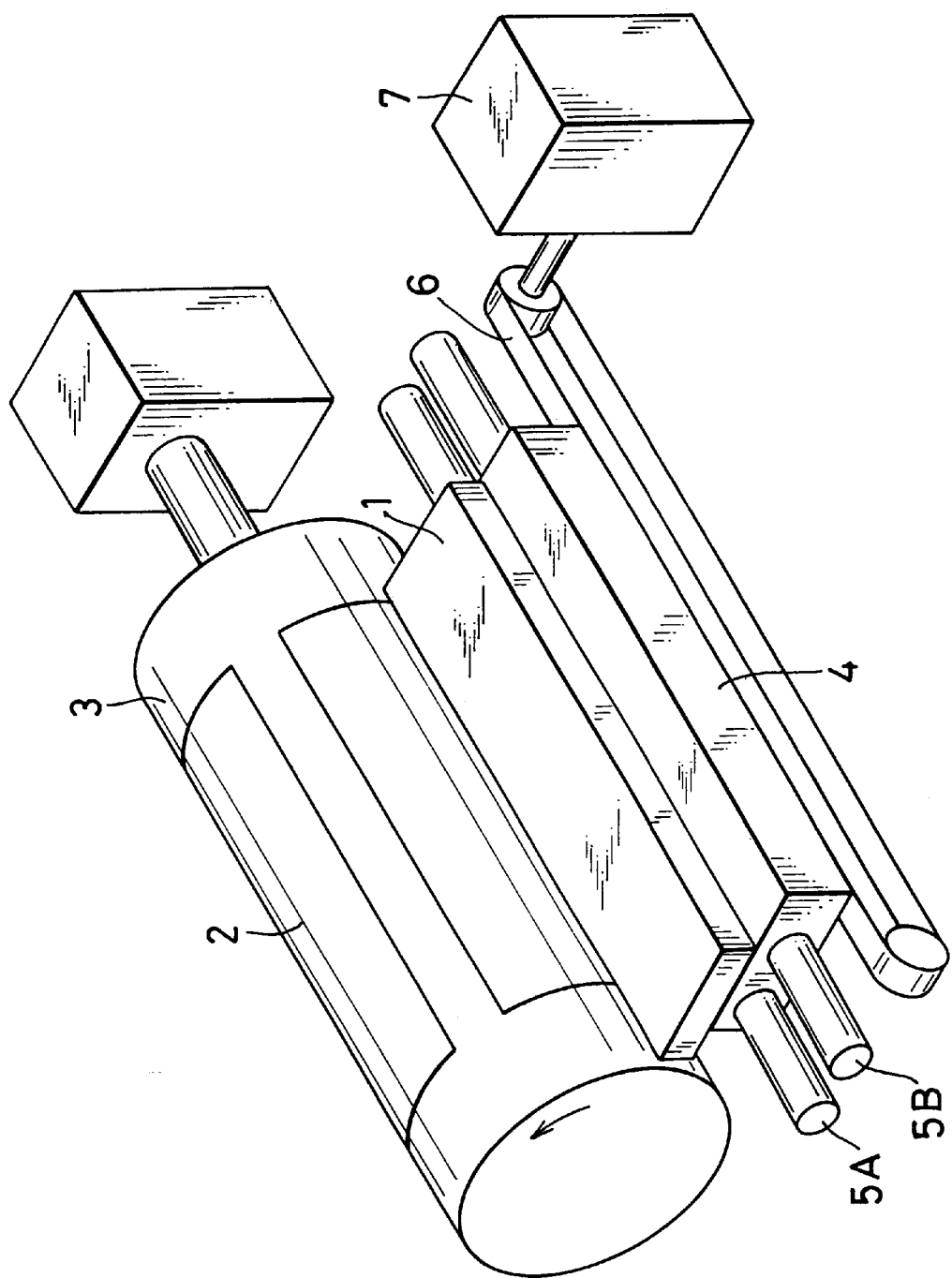
FIG. 10 is a schematically perspective view of an ink jet recording apparatus according to a fourth embodiment of the present invention.
Figure 11:
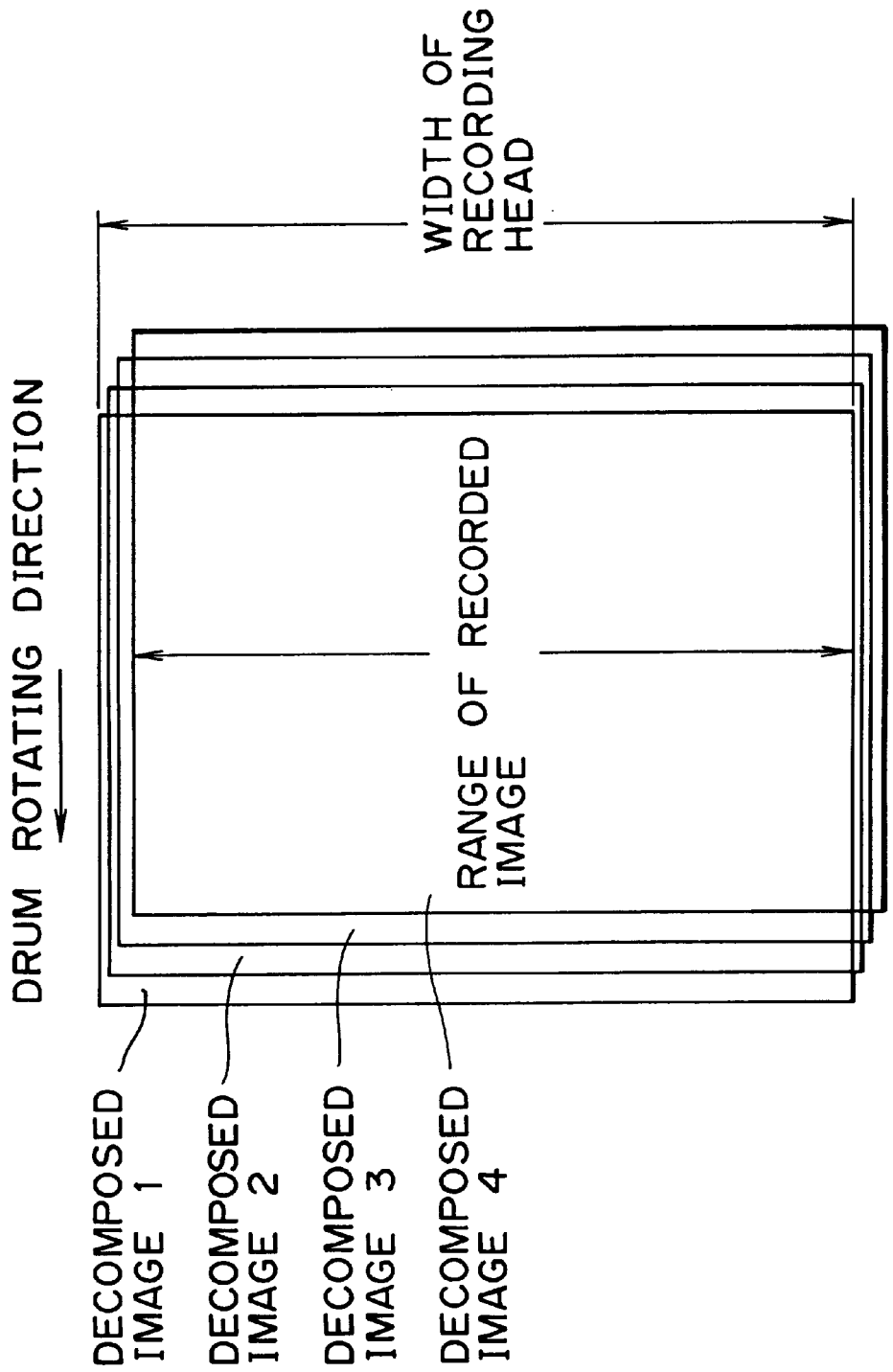
FIG. 11 is a schematic view of a recorded image illustrating a recording process to be practiced according to the fourth embodiment of the present invention.

Recording is effected with five gray levels at a pixel density of 16 dots/mm with the aid of the same ink jet recording apparatus as that in the first embodiment with the exception of a recording head including 4690 ejection ports and having a pitch between adjacent ejection ports set to 64 μm. FIG. 10 is a perspective view of an ink jet recording apparatus constructed according to the fourth embodiment of the present invention, and FIG. 11 is an illustrative view which schematically illustrates a recording process to be practiced according to the embodiment of the present invention. According to the embodiment of the present invention, as shown in FIG. 10, the recording head 1 includes a row of ejection ports arranged across the width of a recording paper 2 as seen in the direction of rotation of a drum 3, and while it is mounted on a carriage 4, it can be displaced at a certain distance in the direction of arrangement of the ejection ports. When a recording operation is performed, first, image data covering the whole image are inputted into a controlling unit (not shown) for the ink jet recording apparatus, and thereafter, image processing is achieved with five gray levels at a pixel density of 16 dots/mm based on the image data so that the whole image is decomposed into four decomposed images.

While the recording head 1 is located at the left end of a drum 3 as seen in FIG. 10, the drum 3 is rotated by a single turn so that a decomposed image 1 is recorded on a recording paper 2 using ejection ports designated by ejection port Nos. 4 to 4690. Next, the recording head 1 is displaced in the rightward direction at a distance corresponding to one pixel, and the drum 3 is then rotated by a single turn so that a decomposed image 2 is recorded on the recording paper 2 using ejection ports designated by ejection port Nos. 3 to 4689. In addition, the recording head 1 is displaced further in the rightward direction at a distance corresponding to one pixel, and the drum 3 is then rotated by a single turn so that a decomposed image 3 is recorded on the recording paper 2 using ejection ports designated by ejection port Nos. 2 to 4688. Additionally, the recording head 1 is displaced further in the rightward direction at a distance corresponding to one pixel, and the drum 3 is then rotated by a single turn so that a decomposed image 4 is recorded on the recording paper 2 using ejection ports designated by ejection port Nos. 1 to 4687. In such manner, each pixel on the image having a width corresponding to 4687 pixels is formed by ink droplets of which number is zero to four. Incidentally, positional offset of one decomposed image from another one as seen in the direction of rotation of the drum in FIG. 11 is shown in the drawing merely for the purpose of clear understanding but such positional offset as shown in the drawing is practically not present.

Since a plurality of ink droplets are shot into each pixel at a comparatively long time interval per each pixel for recording the image on the record paper, the ink droplets are sufficiently fixed within the foregoing time interval. Thus, there do not arise problems that the recorded image is contaminated with the ejected ink, and moreover, different kinds of inks are mixed with each other on the recording paper. In addition, since a coloring substance remains on the comparatively upper surface of the recording paper, so-called ink penetration does not occur, resulting in a clear image visually recognizable with a beautiful color being obtained with the ink jet recording apparatus.

Further, similarly to the first embodiment, since the recording paper is made come closely in contact with the drum, the positional offset of the pixel hardly occurs.

Other Embodiments

In each of the aforementioned embodiments, the drum or the cylindrical platen roller is employed as a supporting member for holding the recording paper while coming in close contact therewith. Alternatively, other type of supporting member such as a flat plate-shaped supporting member, a rotating endless belt or the like for holding the recording paper while coming in close contact therewith may be employed in place of the drum or the platen roller.

To carry out the present invention, it is recommendable that the supporting member for holding the recording paper while coming in close contact therewith is heated by a heater. Although it is well known for any expert in the art that the supporting member is heated for the purpose of promoting evaporation of ink so as to allow the ink to be promotively fixed in the recording paper, an advantageous effect attainable by heating has been not hitherto proven. In contrast with the conventional ink jet recording apparatus, according to the present invention, since an image to be recorded on the recording paper is decomposed into a plurality of decomposed images, a small quantity of ink is used for the purpose of recording per each decomposed image, and moreover, a long time is reserved for completely recording the plural decomposed images, causing the recording paper to come in close contact with the supporting member within the foregoing long time with the result that the ink is sufficiently evaporated from the recording paper. For this reason, the heating of the supporting member is very effectively employable for carrying out the present invention.

It should be noted that the present invention may equally be applied to case that a cloth or a film is employed in place of the recording paper as a medium to be recorded with ink.

In addition, in each of the aforementioned embodiments, an ejection heater is disposed corresponding to a single ink ejection port or a single ink ejection outlet. Alternatively, a plurality of ejection heaters may be disposed corresponding to a single ink ejection port. Otherwise, a single ejection heater may be disposed corresponding to a plurality of ink ejection ports. In this specification, it is assumed that a portion at which ink is ejected or discharged from a different position on the recording head is defined as an ink ejection portion.

The present invention achieves distinct effect when applied to a recording head or a recording apparatus which has means for generating thermal energy such as electrothermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consists of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. As examples of the recovery system, are a capping means and a cleaning means for the recording head, and a pressure or suction means for the recording head. As examples of the preliminary auxiliary system, are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An ink jet recording apparatus which uses a recording head for ejecting an ink in order to record an image on a recording medium, the image being formed from a plurality of images which are respectively recorded on a plurality of regions of the recording medium, said apparatus comprising:

scanning means for performing a scanning operation of the recording head relative to the recording medium, and record control means for causing said scanning means to perform said scanning operation a first time and a second time on a given said region and causing the recording head to eject the ink so as to perform recording on said given region, wherein, between said first and said second scanning operations on said given region, an intermediate scanning operation is performed to record on another of said plurality of regions other than said given region.

2. An ink jet recording apparatus as claimed in claim 1, wherein said record control means, based on a plurality of decomposed driving data which are obtained by decomposing a driving data for recording a predetermined unit image on the recording medium into the plural decomposed driving data corresponding to an image having substantially a same expansion as that of said predetermined unit image to be recorded on the recording medium based on the driving data, performs recording during plural scanning operations by said scanning means, wherein a scanning operation for performing recording on one scanning region of the recording medium on which recording was performed based on one of said plural decomposed driving data, based on another of said plural decomposed driving data, is performed after a scanning operation for performing recording on another of said regions other than said one scanning region on which recording was performed based on one of said decomposed driving data.

3. An ink jet recording apparatus as claimed in claim 1, wherein said record control means decomposes a driving data for recording a predetermined unit image on the recording medium into a plurality of decomposed driving data corresponding to an image having substantially a same expansion as that of said predetermined unit image to be recorded on the recording medium based on the driving data, and performs recording during plural scanning operations by said scanning means, wherein the scanning operation for performing recording on one scanning region of the recording medium on which recording was performed based on one of said decomposed driving data, based on another of said plural decomposed driving data, is performed after a scanning operation for performing recording on another of said scanning regions other than said one scanning region on which recording was performed based on one of said decomposed driving data.

4. An ink jet recording apparatus as claimed in claim 3, wherein said record control means controls said scanning means and assigns each of said decomposed driving data so that plural images each of which has substantially a same expansion as that of said predetermined unit image are sequentially recorded via respective ones of said plural different scannings based on each of said decomposed driving data, respectively.

5. An ink jet recording apparatus as claimed in claim 4, wherein said recording head includes a plurality of ink ejection portions through each of which is ejected the ink, and wherein said record control means assigns each of said decomposed driving data so that at least some of a plurality of pixels in a given said image are recorded with the ink ejected from different said ink ejection portions, said given image being recorded based on each of said decomposed driving data and having substantially the same expansion as the expansion of said predetermined unit image.

6. An ink jet recording apparatus as claimed in claim 5, wherein said record control means decomposes said driving data into a plurality of decomposed driving data depending on a position of each said pixel in said predetermined unit image.

7. An ink jet recording apparatus as claimed in claim 5, further comprising:
   a supporting member for supporting said recording medium; and
   close contacting means for bringing said recording medium into close contact with said support member from a time when recording of said predetermined unit image is started to a time when said recording is completed.

8. An ink jet recording apparatus as claimed in claim 7, wherein said supporting means comprises a platen roller having a diameter and which is rotatably disposed for said plural different scannings, and the diameter of said platen roller is selected such that a part of said recording medium is brought into close contact with said platen roller when said predetermined unit image is recorded while said platen roller is rotated.

9. An ink recording apparatus as claimed in claim 7, wherein said recording head further comprises a thermal energy generating element disposed in said recording head such that a bubble is generated when said thermal energy generating element generates and applies thermal energy to the ink, the ink being ejected as a result of growth of the bubble.

10. An ink jet recording apparatus as claimed in claim 5, wherein a width of an image recorded during each of said plural different scannings is dimensioned to be less than the width of said predetermined unit image.

11. An ink jet recording apparatus as claimed in claim 5, wherein a width of an image recorded during each of said plural different scannings is allowed to be dimensioned to be more than the width of said predetermined unit image.

12. An ink jet recording apparatus as claimed in claim 5, wherein said data processing means decompose said driving data into a plurality of decomposed driving data so as to allow a frequency of usage of said plurality of ink ejection portions to be substantially uniformalized.

13. An ink jet recording apparatus as claimed in claim 5, wherein said data processing means decomposes said driving data into a plurality of decomposed driving data depending on the gray level of each pixel in said predetermined unit image.

14. An ink jet recording apparatus as claimed in claim 5, wherein said data processing means randomly decomposes said driving data into a plurality of decomposed driving data.

15. An ink jet recording apparatus as claimed in claim 1, wherein said record control means decomposes a data of an image to be recorded into a plurality of data of decomposed images each of which has substantially a same expansion as an expansion of the image to be recorded, divides each of said data of decomposed images into a plurality of data of divided images which correspond to a plurality of scanning regions by said scanning means, respectively, and causes said scanning means to perform the scanning operation and drives the recording head to perform recording based on data of the divided image corresponding to at least one said scanning region which corresponds to one of the decomposed images and to subsequently perform recording based on data of the divided image corresponding to the scanning region which corresponds to another of said decomposed images, wherein the scanning region on which the recording is performed last based on the data of said divided image corresponding to said at least one scanning region of the plurality of scanning regions which correspond to said one of the decomposed images, and the scanning region on which the recording is performed first based on the data of said divided image corresponding to the scanning region which corresponds to said another of said plurality of decomposed images, are not identical to each other.

16. An ink jet recording apparatus as claimed in claim 1, wherein said recording head ejects a plurality of inks of different colors.

17. An ink jet recording apparatus according to claim 1, further comprising;
   support means for supporting the recording medium, wherein said scanning means performs the scanning operation of the recording medium relative to the recording head while the recording medium is supported by said supporting means;
   head driving means for causing the recording head to discharge ink based on driving data;
   data processing means for decomposing the driving data for recording a predetermined unit image on the recording medium into a plurality of decomposed driving data corresponding to an image having the substantially same expansion as that of said predetermined unit image to be recorded on the recording medium based on said driving data, and wherein said record control means controls said scanning means so as to scan the recording medium relative to the recording head and for assigning each of said plurality of decomposed driving data to driving data for said head driving means which are used for respective ones of plural different scanning operations which are not continuously performed, so that said predetermined unit image is recorded; and
   close contacting means for making the recording medium in close contact with said supporting means while at least said predetermined unit image is recorded on the recording medium.

18. An ink jet recording apparatus as claimed in claim 1, wherein the recording head generates a bubble by causing thermal energy to act on ink so that the ink is discharged on growth of the bubble.

19. An ink jet recording apparatus as claimed in claim 18, wherein the recording head discharges inks, each having a different color.

20. An ink jet recording apparatus which performs recording using a recording head which ejects an ink onto a recording medium, comprising:
   scanning means for performing a scanning operation to relatively move the recording medium with respect to the recording head,
   data processing means for decomposing a data of an image to be recorded into a plurality of data of decomposed images each of which has substantially a same expansion as an expansion of said image to be recorded, and for dividing each of said plurality of data of decomposed images into a plurality of data of divided images which correspond to a plurality of scanning regions by said scanning means, respectively; and
   recording control means for causing said scanning means to perform the scanning operation and driving the recording head to perform recording based on data of the divided image corresponding to at least one said scanning region which corresponds to one of the decomposed images and to subsequently perform recording based on data of the divided image corresponding to the scanning region which corresponds to another of said decomposed images, wherein the scanning region on which the recording is performed last on based on data of said divided image corresponding to said at least one said scanning region which corresponds to said one of the decomposed images, and the scanning region on which the recording is performed first based on data of said divided image corresponding to the scanning region which correspond to said another of said decomposed images, are not identical to each other.

21. An ink jet recording method which uses a recording head for ejecting an ink in order to record on a recording medium, comprising the steps of:

performing, a plurality of times, a scanning operation of the recording head relative to a given region of the recording medium; and performing recording on said given region of the recording medium, wherein, between a first and a second scanning operation on said given region, an intermediate scanning operation is performed to record on another region of the recording medium other than said given region.

22. An ink jet recording method as claimed in claim 21, wherein said step for performing recording, based on a plurality of decomposed driving data which are obtained by decomposing driving data for recording a predetermined unit image on the recording medium into the plurality of decomposed driving data corresponding to an image having substantially a same expansion as that of said predetermined unit image to be recorded on the recording medium based on the driving data, performs recording during plural scanning operations, wherein a scanning operation for performing recording on one scanning region of the recording medium on which region recording was performed based on one of said decomposed driving data, based on another of said decomposed driving data, is performed after a scanning operation for performing recording on another scanning region other than said one scanning region on which region recording was performed based on one of said decomposed driving data.

23. An ink jet recording method as claimed in claim 21, wherein said step for performing recording decomposes a data of an image to be recorded into a plurality of data of decomposed images each of which has substantially the same expansion as an expansion of said image to be recorded, divides each of said data of decomposed images into a plurality of data of divided images which correspond to plural scanning regions, respectively, and performs the scanning operation and driving the recording head to perform recording based on data of the divided image corresponding to at least one said scanning region which corresponds to one of the decomposed images and to subsequently perform recording based on data of the divided image corresponding to the scanning region which corresponds to another of said decomposed images, wherein the scanning region on which the recording is performed last based on data of said divided image corresponding to said at least one said scanning region which corresponds to said one of the decomposed images, and the scanning region on which the recording is performed first based on data of said divided image corresponding to the scanning region which corresponds to said another of said decomposed images, are not identical to each other.

24. An ink jet recording method according to claim 21, further comprising the step of;

decomposing an image to be recorded into a plurality of decomposed images, wherein said step of performing recording records one of said decomposed images ahead of other decomposed images, and records a subsequent decomposed image on the ahead recorded decomposed image in an overlapped state by a scanning operation which is not continuously performed subsequent to the scanning performed for the ahead recorded decomposed image, and wherein each pixel in said image is formed with the ink ejected from different ejection portions during the ahead performed recording and the subsequently performed recording.

25. An ink jet recording method as claimed in claim 21, wherein the recording medium is held on a supporting member from a time when recording of the recording medium is started till the time when the recording is completed.

26. An ink jet recording method as claimed in claim 21, wherein the recording head generates a bubble by causing thermal energy to act on ink so that the ink is ejected on growth of the bubble.

27. An ink jet recording method as claimed in claim 24, wherein said recording head ejects inks with different colors.

* * * * *

UNITED STATES PATENT AND TRADEMARK OFFICE
CERTIFICATE OF CORRECTION

PATENT NO. : 6,217,142 B1
DATED : April 17, 2001
INVENTOR(S) : Makoto Shioya et al.

It is certified that error appears in the above-identified patent and that said Letters Patent is hereby corrected as shown below:

Title page,
Under Item [56] References Cited, U.S. PATENT DOCUMENTS, please insert the following:
-- 4,463,361    7/1984    Koumura et al.    346/134
4,622,561    11/1986    Koike    347/41
5,030,971    7/1991    Drake et al.    347/57 --.

Under Item [56] References Cited, FOREIGN PATENT DOCUMENTS, please insert the following:
-- WO 9304443    3/1993    Int'l PCT
0 228 545    7/1987    (EP)
0 253 200    1/1988    (EP)
2-175537    7/1990    (JP)
3-155947    7/1991    (JP)
0 473 178    3/1992    (EP) --.

"3231861    10/1991 (JP)" should read -- 3-231861    10/1991    (JP) --.

Column 1,
Line 33, "can not" should read -- cannot --;
Line 18, "papers" should read -- paper --; and
Line 44, "Laying-Open" should read -- Laid-Open --.

Column 2,
Line 47, "comprises;" should read -- comprises: --; and
Line 66, "continuously," should read -- continuous, --.

Column 3,
Line 5, "prises;" should read -- prises: --;
Line 36, "of;" should read -- of: --; and
Line 59, "Fig. 1" should read -- Fig. 1, --.

UNITED STATES PATENT AND TRADEMARK OFFICE
CERTIFICATE OF CORRECTION

PATENT NO. : 6,217,142 B1
DATED : April 17, 2001
INVENTOR(S) : Makoto Shioya et al.

It is certified that error appears in the above-identified patent and that said Letters Patent is hereby corrected as shown below:

Column 5,
Line 46, "case" should read -- a case --; and
Line 60, "operating," should read -- operation, --.

Column 7,
Line 15, "same" should read -- the same --.

Column 8,
Line 55, "An" should read -- A --.

Column 10,
Line 64, "can" should be deleted; and
Line 65, "exactly be" should read -- exactly can be --.

Column 12,
Line 29, "made" should read -- made to --.

Column 13,
Line 61, "case" should read -- a case --.

Column 17,
Line 43, "decompose" should read -- decomposes --.

Column 18,
Line 16, "comprising;" should read -- comprising: --.

Column 19,
Line 8, "on" (second occurrence) should be deleted.

UNITED STATES PATENT AND TRADEMARK OFFICE
CERTIFICATE OF CORRECTION

PATENT NO. : 6,217,142 B1
DATED : April 17, 2001
INVENTOR(S) : Makoto Shioya et al.

It is certified that error appears in the above-identified patent and that said Letters Patent is hereby corrected as shown below:

Column 20,
Line 23, "of;" should read -- of: --.

Signed and Sealed this

Sixteenth Day of April, 2002

Attest:

JAMES E. ROGAN
*Attesting Officer*   *Director of the United States Patent and Trademark Office*